(12) United States Patent
Xiong

(10) Patent No.: US 8,989,009 B2
(45) Date of Patent: Mar. 24, 2015

(54) PORT AND PRIORITY BASED FLOW CONTROL MECHANISM FOR LOSSLESS ETHERNET

(75) Inventor: Yijun Xiong, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 61 days.

(21) Appl. No.: 13/336,260

(22) Filed: Dec. 23, 2011

(65) Prior Publication Data

US 2012/0275301 A1 Nov. 1, 2012

Related U.S. Application Data

(60) Provisional application No. 61/480,671, filed on Apr. 29, 2011.

(51) Int. Cl.
*H04L 12/26* (2006.01)
*H04L 12/939* (2013.01)
(Continued)

(52) U.S. Cl.
CPC ........ *H04L 49/552* (2013.01); *H04L 2012/5635* (2013.01); *H04L 49/351* (2013.01); *H04L 49/357* (2013.01); *H04L 49/506* (2013.01); *H04L 47/266* (2013.01); *H04L 47/6295* (2013.01)
USPC ............ 370/236; 370/218; 370/222; 370/231

(58) Field of Classification Search
CPC ................ H04L 49/506; H04L 49/505; H04L 2012/5635
USPC .................................. 370/218, 222, 231, 236
See application file for complete search history.

(56) References Cited

U.S. PATENT DOCUMENTS 6,067,298 A * 5/2000 Shinohara ................ 370/395.71
6,324,165 B1 * 11/2001 Fan et al. ........................ 370/232
(Continued)

FOREIGN PATENT DOCUMENTS

CN 101253729 A 8/2008
CN 101378357 A 3/2009
(Continued)

OTHER PUBLICATIONS

"Draft for Local and Metropolitan Area Networks—Virtual Bridged Local Area Networks—Amendment: Priority-Based Flow Control," IEEE P802.1 Qbb/ D2.3, May 25, 2010, 40 pages.
(Continued)

*Primary Examiner* — Ricky Ngo
*Assistant Examiner* — Dewanda Samuel
(74) *Attorney, Agent, or Firm* — Conley Rose, P.C.; Grant Rodolph; William H. Dietrich

(57) ABSTRACT

An apparatus comprising an aggregation/core switch configure to couple to an edge switch and receive information about a plurality of end system facing ports of the edge switch, wherein the information about the end system facing ports is used to associate the end system facing ports with a plurality of corresponding queues at the aggregation/core switch. Also disclosed is a network component comprising a receiver configured to receive information about a plurality of end system facing ports of an edge switch, a processor configured to establish and associate the end system facing ports with a plurality of corresponding queues, and a transmitter configured to return information about the associated end system facing ports.

22 Claims, 12 Drawing Sheets

(51) Int. Cl.
*H04L 12/825* (2013.01)
*H04L 12/863* (2013.01)
*H04L 12/70* (2013.01)
*H04L 12/931* (2013.01)

(56) References Cited

U.S. PATENT DOCUMENTS

| | | | |
|---|---|---|---|
| 6,526,024 B1 * | 2/2003 | Spagnolo et al. | 370/236 |
| 6,636,510 B1 * | 10/2003 | Lee et al. | 370/390 |
| 6,842,423 B1 | 1/2005 | Erimli et al. | |
| 6,981,054 B1 * | 12/2005 | Krishna | 709/235 |
| 6,999,453 B1 * | 2/2006 | Chemla et al. | 370/389 |
| 7,164,687 B2 * | 1/2007 | Namihira | 370/412 |
| 7,426,185 B1 * | 9/2008 | Musacchio et al. | 370/235.1 |
| 7,916,647 B2 * | 3/2011 | Kanda et al. | 370/237 |
| 7,978,606 B2 * | 7/2011 | Buskirk et al. | 370/235 |
| 8,009,569 B2 * | 8/2011 | Tagore-Brage et al. | 370/236 |
| 8,023,413 B2 * | 9/2011 | Kadambi et al. | 370/235 |
| 8,218,442 B2 * | 7/2012 | Godbole et al. | 370/235 |
| 8,264,985 B2 * | 9/2012 | DeSanti | 370/254 |
| 8,335,236 B2 * | 12/2012 | Dhar et al. | 370/474 |
| 8,462,774 B2 * | 6/2013 | Page et al. | 370/369 |
| 2002/0064154 A1 * | 5/2002 | Sharma et al. | 370/357 |
| 2002/0080789 A1 * | 6/2002 | Henderson et al. | 370/392 |
| 2006/0165111 A1 * | 7/2006 | Varma | 370/428 |
| 2006/0285548 A1 * | 12/2006 | Hill et al. | 370/416 |
| 2007/0081454 A1 | 4/2007 | Bergamasco et al. | |
| 2007/0268830 A1 * | 11/2007 | Li et al. | 370/235 |
| 2007/0268903 A1 * | 11/2007 | Nakagawa | 370/392 |
| 2009/0003212 A1 * | 1/2009 | Kwan et al. | 370/235 |
| 2009/0059937 A1 | 3/2009 | Kanada | |
| 2009/0300209 A1 * | 12/2009 | Elzur | 709/234 |
| 2010/0157803 A1 * | 6/2010 | Rivers et al. | 370/235 |
| 2011/0064086 A1 | 3/2011 | Xiong et al. | |
| 2012/0033669 A1 * | 2/2012 | Mohandas et al. | 370/392 |
| 2012/0163395 A1 * | 6/2012 | Shukla et al. | 370/409 |

FOREIGN PATENT DOCUMENTS

| | | |
|---|---|---|
| CN | 102025617 A | 4/2011 |
| EP | 0901302 A2 | 3/1999 |
| WO | 0215489 A2 | 2/2002 |

OTHER PUBLICATIONS

"Fibre Channel, Backbone-5 (FC-BB-5) Rev. 2.00," Global Engineering, Jun. 4, 2009, 180 pages.
"Draft Standard for Local and Metropolitan Area Networks—Virtual Bridged Local Area Networks—Amendment XX: Enhanced Transmission Selection for Bandwidth Sharing Between Traffic Classes," IEEE P802.1Qaz/D2.5, Mar. 28, 2011, 109 pages.
"Fibre Channel, Switch Fabic-5 (FC-SW-5) Rev. 8.0," Global Engineering, Nov. 22, 2006, 329 pages.
DeSanti, Claudio, "FDF Routing," CISCO, T11/10-465v0, Oct. 2010, 34 pages.
Brocade brochure, "Virtual Domain," T11/10-345v1, 40 pages.
Foreign Communication From a Related Counterpart Application, PCT/CN2012/070002, International Search Report dated Apr. 12, 2012, 3 pages.
Foreign Communication From a Related Counterpart Application, PCT/CN2012/070002, Written Opinion dated Apr. 12, 2012, 10 pages.
Foreign Communication From a Counterpart Application, European Application No. 12777753.0, Extended European Search Report dated Nov. 26, 2013, 8 pages.

* cited by examiner

PORT AND PRIORITY BASED FLOW CONTROL MECHANISM FOR LOSSLESS ETHERNET

CROSS-REFERENCE TO RELATED APPLICATIONS

The present application claims the benefit of U.S. Provisional Patent Application 61/480,671, filed Apr. 29, 2011 by Y. Xiong, entitled "Method and System of Centralized Control and Management for Fiber Channel over Ethernet Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Fiber Channel over Ethernet (FCoE) is a technology used for transporting Fiber Channel (FC) frames over Ethernet, which is currently being standardized at the Technical Committee for Fiber Channel (T11) of the International Committee for Information Technology Standards (INCITS). The transported FC frames are used based on an FC architecture for storage networking purposes. The FCoE technology replaces the FC physical (FC-0) and FC coding (FC-1) layers of the FC architecture with the Ethernet physical and Media Access Control (MAC) layers of the Ethernet architecture without altering the FC framing (FC-2) layer and higher layers. Using the FCoE technology, the FC frames and standard Ethernet frames can be transported independently in the network. Accordingly, the FC frames are mapped over Ethernet frames and then transmitted on Ethernet links, which provides substantially seamless integration between FC based networks and Ethernet based networks. The FCoE technology can be used for server Input/Output (I/O) consolidation for FC-based storage area networks (SANs), which are widely used in enterprise data centers, and potentially for establishing a unified network infrastructure for data centers based on Ethernet.

SUMMARY

In one embodiment, the disclosure includes an apparatus comprising an aggregation/core switch configured to couple to an edge switch and receive information about a plurality of end system facing ports of the edge switch, wherein the information about the end system facing ports is used to associate the end system facing ports with a plurality of corresponding queues at the aggregation/core switch.

In another embodiment, the disclosure includes a network component comprising a receiver configured to receive information about a plurality of end system facing ports of an edge switch, a processor configured to establish and associate the end system facing ports with a plurality of corresponding queues, and a transmitter configured to return information about the associated end system facing ports.

In another embodiment, the disclosure includes a method implemented by a network component comprising receiving from an edge switch in a data center information about a plurality of end system facing ports of the edge switch, and associating a plurality of data forwarding queues at an aggregation/core switch coupled to the edge switch with the end system facing ports of the edge switch.

In yet another embodiment, the disclosure includes an apparatus comprising an edge switch comprising a plurality of end system facing ports and configured to couple to a plurality of end systems via the end system facing ports and to an aggregation/core switch and to send information about the end system facing ports to the aggregation/core switch, wherein the information about the end system facing ports is used to associate the end system facing ports with a plurality of corresponding queues at the aggregation/core switch.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
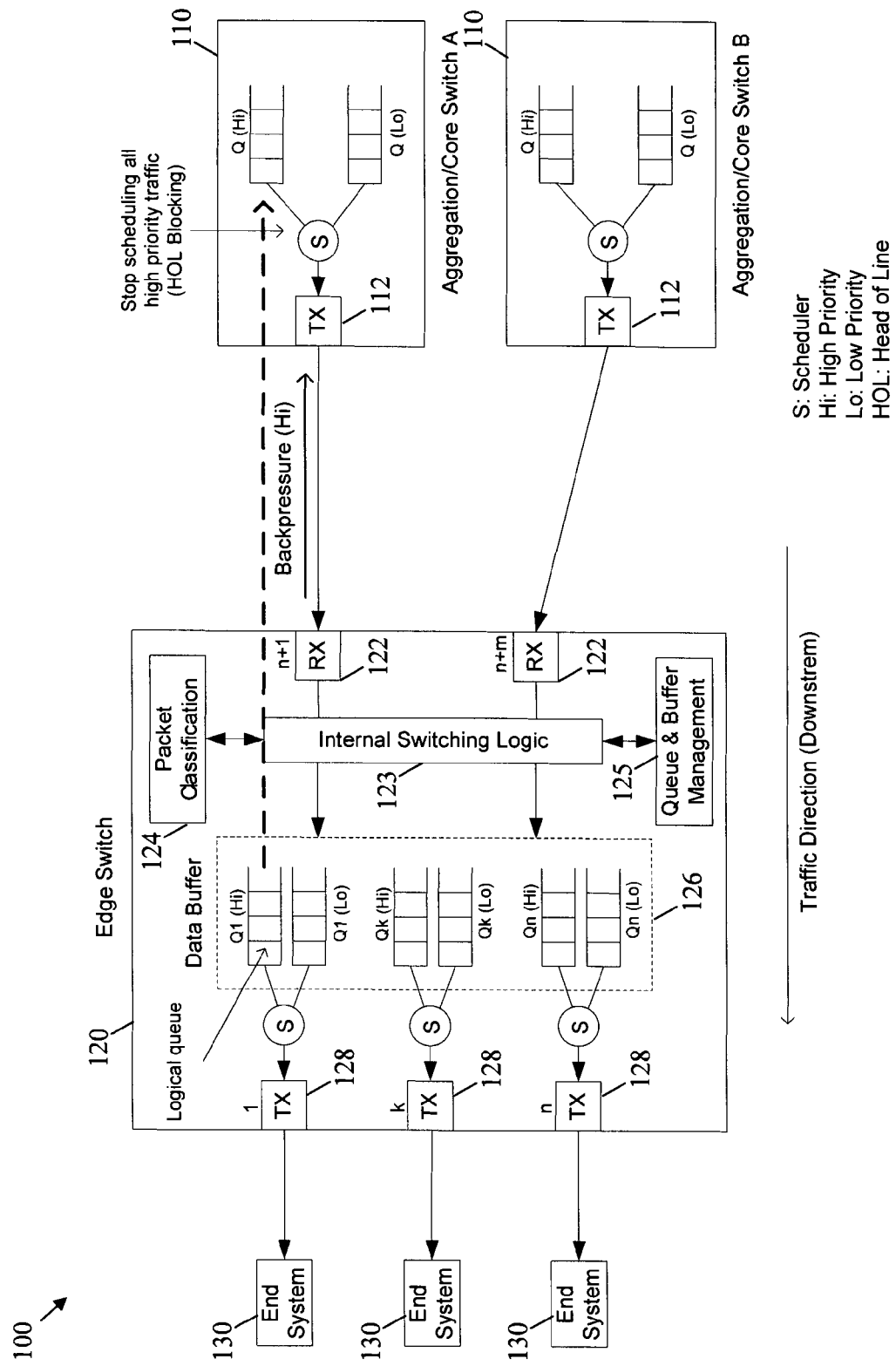
FIG. 1 is a schematic diagram of an embodiment of a priority-based flow control (PFC) system.

In packet switched networks, packet loss may occur due to switch buffer overflow that may be caused by traffic congestion. Some network traffic, such as FC traffic using FCoE, may not tolerate any substantial packet loss. To support such traffic, e.g., in an Ethernet network, a PFC is proposed to guarantee lossless packet communications, as described in the Institute of Electrical and Electronics Engineers (IEEE) P802.1Qbb/D2.3 standard, May 25, 2010, entitled "Priority-based Flow Control", which is incorporated herein by reference. FIG. 1 illustrates an embodiment of a PFC system 100 that may be used in a data center. The PFC system 100 may comprise one or more aggregation/core switches 110, at least one edge switch 120 coupled to the aggregation/core switches 110, and a plurality of end systems 130 coupled to the edge switch 120. The components of the PFC system 100 may be arranged as shown in FIG. 1.

The aggregation/core switches 110 and the edge switch 120 may be any network components or nodes configured to transfer data in the data center, e.g., Ethernet data in the form of packets or frames. The aggregation/core switches 110 and the edge switch 120 may forward the data to destination components in the data center based on network addresses, such as Internet Protocol (IP) addresses and/or MAC addresses, which may be indicated in the data. The data also may be forwarded using forwarding tables, e.g., maintained in the aggregation/core switches 110 and the edge switch 120. The edge switch 120 may correspond to a top-of-rack (TOR) switch in the data center. The end systems 130 may be any systems, components, or nodes coupled to and configured to exchange data with the data center, such as servers and/or storage devices.

Each aggregation/core switch 110 may comprise a plurality of queues for different priority traffic (e.g., a queue for high priority traffic Q(Hi) and a queue for low priority traffic Q(Lo)). The queues may be located in a data buffer (not shown) in the aggregation/core switch 110. The number of queues per port in each aggregation/core switch 110 may be about the same (e.g., about two queues per port in each aggregation/core switch 110 if two traffic priorities are supported). Each aggregation/core switch 110 also may comprise an output or outgoing port 112 (labeled TX) that may be coupled to the queues via a scheduler (S).

The edge switch 120 may comprise one or more ingress ports 122 (labeled RX), an internal switching logic unit 123 coupled to each ingress port 122, a packet classification unit 124, a queue and buffer management unit 125, and a data buffer 126, all of which are coupled to the internal switching logic unit 123, and one or more egress ports 128 (labeled TX) coupled to the data buffer 126. Each of the ingress ports 122 may be coupled to one of the aggregation/core switches 110, and each of the egress ports 128 may be coupled to one of the end systems 130. The number of ingress ports 122 in the edge switch 120 may be the same as or different from the number of egress ports 128. The components of the edge switch 120 may be arranged as shown in FIG. 1.

Each ingress port 122 may be coupled to one of the aggregation/core switches 110 via the outgoing port 112 of the aggregation/core switch 110, and may be configured to receive data (e.g., packets) from the corresponding aggregation/core switch 110. The internal switching logic unit 123, the packet classification unit 124, and the queue and buffer management unit 125 may communicate with each other to determine which of the packets received in the ingress ports 122 to send to which of a plurality of queues in the data buffer 126. The packet classification unit 124 may determine the priority level (e.g., high or low priority) and the egress port of the received packets, e.g., using data in the packets. The queue and buffer management unit 125 may determine the appropriate queue in the data buffer 126 for receiving the packets as classified by the packet classification unit 124. The internal switching logic unit 123 may switch the packets from the ingress ports 122 to the appropriate queues in the data buffer 126 as instructed by the queue and buffer management unit 125. The data buffer 126 may comprise a plurality of queues (e.g., Q1, . . . Qk, . . . , Qn, where k and n are integers and k≤n) that may be coupled to corresponding egress ports 128 (e.g., TX1, . . . , TXk, . . . , TXn).

Each egress port 128 may be coupled to and associated with at least two corresponding queues in the data buffer 126 that may have different priorities (e.g., low (Lo) and high (Hi) priorities). Each egress port 128 may be coupled to a separate set of queues (e.g., about two queues for low and high priority packets). The traffic from the queues coupled to the same egress port 128 may be scheduled by a corresponding scheduler (S) positioned between the queues in the set and the associated egress port 128. Each egress port 128 may be assigned about the same number of queues (e.g., about two queues) as the other TXs 128. Each TX 128 may forward the packets received from the queues to one corresponding end system 130. The end systems 130 may receive and use the data from the egress ports 128. The data or packets sent from the aggregation/core switches 110 to the edge switch 120 and then to the corresponding end systems 130 are said to be forwarded in the downstream direction. The edge switch 120 also may forward data or packets in the upstream direction from the end systems 130 to the aggregation/core switches 110 (not shown).

In some cases, traffic congestion may occur in the edge switch 120, e.g., in the downstream direction from any of the aggregation/core switches 110 to the edge switch 120. This congestion may occur, at least partly, when the link bandwidth between the edge switch 120 and the forwarding aggregation/core switch 110 may be substantially larger than the link bandwidth between the edge switch 120 and the receiving end system 130. Typically, the memory or storage capacity of the data buffer 126 may be substantially smaller than the memory or storage capacity of the aggregation/core switch 110, e.g., due to constraints of high port density, small physical size (e.g., about one to two rack unit), and/or low cost of the edge switch 120. In the case of carrying FC traffic that do not tolerate substantial packet loss, a backpressure request may be sent to the forwarding aggregation/core switch 110 if traffic congestion occurs in the edge switch 120. The backpressure request may cause the aggregation/core switch 110 to hold off forwarding packets, and hence prevent FCoE packet loss.

This backpressure procedure may be used in the PFC system 100 and may guarantee lossless packet communications. However, holding off or blocking packets in the aggregation/core switch 110 may cause in some cases head-of-line (HOL) blocking from a forwarding aggregation/core switch 110. HOL blocking is a condition where the aggregation/core switch 110 stops sending traffic at a priority level to all egress ports at the edge switch 120 in response to a backpressure request from the edge switch 120 for one (or more) but not all of the egress ports. HOL blocking may occur when the edge switch 120 decides that the criteria to assert backpressure on an ingress port 122 or an egress port 128 is met for a high priority queue Q1(Hi) and the corresponding egress port (TX1). In this situation, the edge switch 120 may send a backpressure request for traffic Hi to the corresponding aggregation/core switch 110 (e.g., aggregation/core switch A in FIG. 1) using a PFC frame. Thus, the aggregation/core switch 110 may stop sending packets of high priority from Q(Hi) to the edge switch 120 upon receiving the PFC frame from the edge switch 120. The aggregation/core switch 110 may stop sending the packets even if there are high priority packets in Q(Hi) that are destined to other egress ports (e.g., TXk or TXn) of the edge switch 120 that may not have traffic congestion. Since traffic to other egress ports that do not experience congestion is also stopped or blocked, which is referred to as HOL blocking, the PFC scheme may not efficiently control congested traffic, e.g., without causing further unnecessary delays to other non-congested traffic in the data center.

Disclosed herein is a system and methods for implementing a PPFC scheme, which may solve the HOL blocking problem, e.g., caused using the PFC scheme. In the PPFC scheme, the aggregation/core switch may obtain information about the egress ports of an edge switch coupled to the aggregation/core switch. The aggregation/core switch also may obtain the addresses (of end systems) that may be reached by the egress ports. Such information may be obtained using an FCoE Initialization Protocol (FIP) for FCoE systems. Based on this information, the aggregation/core switch may establish a plurality of queues, e.g., for the same traffic priority level, which correspond to a plurality of egress ports of the edge switch. The edge switch also may indicate in the backpressure request the egress port and priority level to the aggregation/core switch. Thus, the aggregation/core switch may block only the queue associated with the indicated egress port and priority level, and allow other queues to send traffic to other egress ports. The PPFC scheme may be advantageous in systems that require lossless traffic, such as FCoE.

Figure 2:
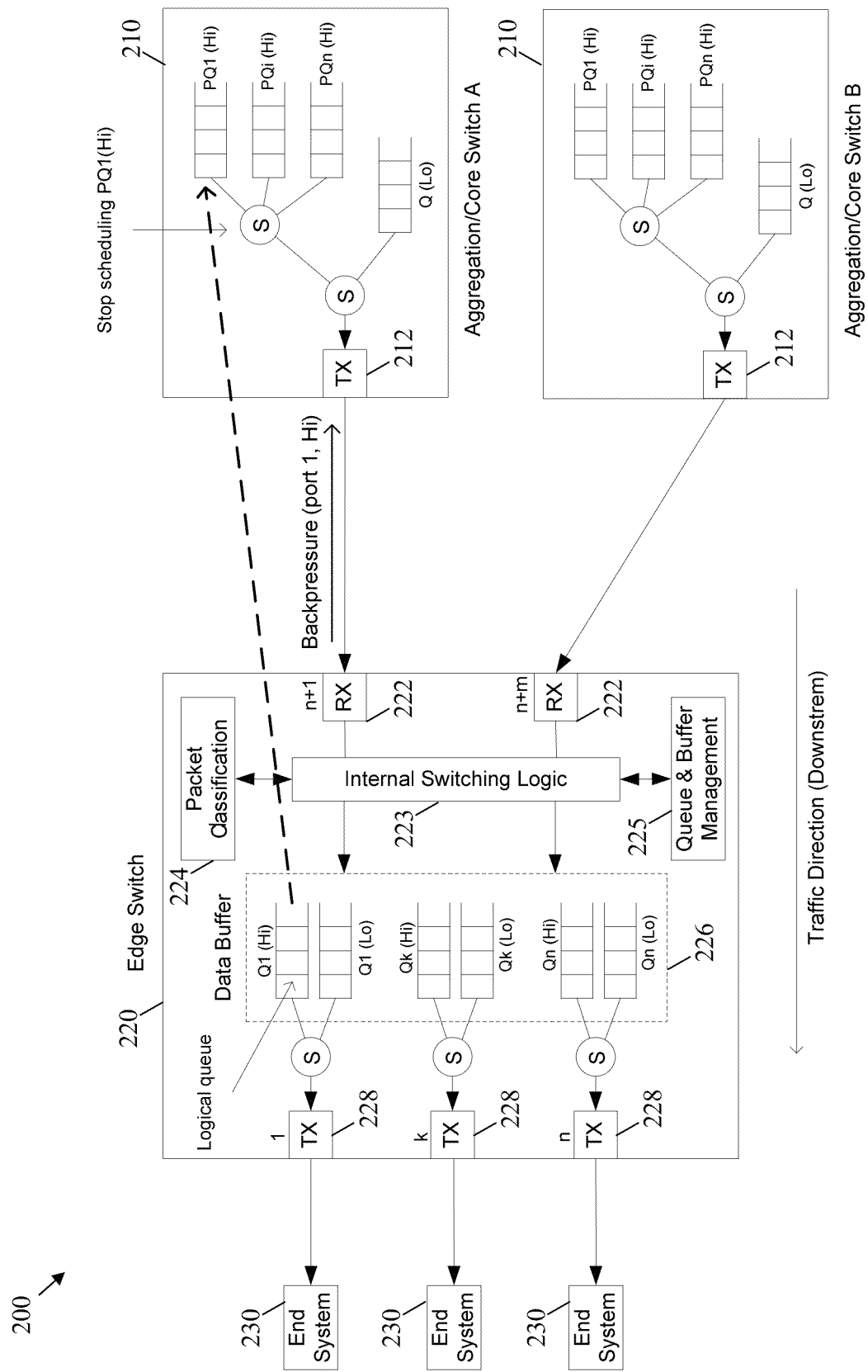
FIG. 2 is a schematic diagram of an embodiment of a priority and port based flow control (PPFC) system.

FIG. 2 illustrates an embodiment of a PPFC system 200, which may support lossless traffic in a data center without causing HOL blocking (from a forwarding aggregation/core switch). The PPFC system 200 may comprise one or more aggregation/core switches 210, at least one edge switch 220 coupled to the aggregation/core switches 210, and a plurality of end systems 230 coupled to the edge switch 220. The components of the PFC system 200 may be arranged as shown in FIG. 2. The edge switch 220 and the end systems 230 may be configured substantially similar to the edge switch 120 and the end systems 130, respectively.

The edge switch 220 may comprise one or more ingress ports 222 (labeled RX), an internal switching logic unit 223 coupled to each ingress port 222, a packet classification unit 224, a queue and buffer management unit 225, and a data buffer 226, all of which are coupled to the internal switching logic unit 223, and one or more egress ports 228 (labeled TXs) coupled to the data buffer 126. Each of the ingress ports 222 may be coupled to one of the aggregation/core switches 210, and each of the egress ports 228 may be coupled to the one of the end systems 230. The edge switch 220 may comprise n egress port 228 (downstream ports facing end systems 230) and m ingress ports 222 (upstream ports facing aggregation/core switches 210), where n and m are equal or different integers. The components of the edge switch 220 may be configured substantially similar to the corresponding components of the edge switch 120 and may be arranged as shown in FIG. 2.

The aggregation/core switches 210 may be configured similar to the aggregation/core switches 110. Each aggregation/core switch 210 may comprise a plurality of queues for different priority traffic (queues for high and low priority traffic). The queues may be located in a data buffer (not shown) in the aggregation/core switch 210. However, unlike the aggregation/core switch 110, the aggregation/core switch 210 may comprise a plurality of queues per port for high priority traffic (PQ1(Hi), . . . , PQi(Hi), . . . , PQn(Hi) (i is an integer and i≤n), which may correspond to the different egress ports 228 (e.g., TX1, . . . , TXk, . . . , TXn) at the edge switch 220. As such, the number of high priority queues per port in the aggregation/core switch 210 may be about equal to the number of egress ports 228 (and to the number of associated queue sets in the data buffer 226). Additionally, the queues in the aggregation/core switch 210 may comprise a queue for low priority traffic Q(Lo). The number of total queues in each aggregation/core switch 210 also may be about the same. Each aggregation/core switch 210 also may comprise an outgoing or output port 212 (labeled TX) that may be coupled to the local queues via one or more schedulers (S), e.g., in a hierarchy or tree topology as shown in FIG. 2.

The aggregation/core switch 210 may perform hierarchical scheduling from the queues to the output port 212. Various scheduling algorithms or combinations thereof may be used at each level of the scheduling hierarchy, e.g., at the different level scheduler (S) (e.g., two schedulers) positioned between the output port 212 and the queues in the aggregation/core switch 210. For instance, a weighted deficit round-robin (WDRR) scheduling algorithm may be used at each priority/class of service (CoS) level (e.g., at each of the two schedulers S). The same algorithm also may be used within a priority/CoS, e.g., in the scheduler S that is directly coupled to the high priority queues (PQ1(Hi), . . . , PQi(Hi), . . . , PQn(Hi).

As described above, the aggregation/core switch 210 may have a hierarchy of different level schedulers, e.g., about two schedulers for scheduling two traffic priorities, high (Hi) and low (Lo), as described above. Low priority traffic may tolerate packet loss, while high priority traffic may be lossless (may not tolerate packet loss). As described above, for high priority traffic, the aggregation/core switch 210 may comprise a queue for each egress port 228 in the edge switch 220. For example, packets with high priority that are to be sent from the aggregation/core switch 210 to one of the egress ports 228, e.g., TXk, may be sent to a corresponding queue in the aggregation/core switch 210, e.g., PQk(Hi). When an aggregation/core switch 210 (e.g., aggregation/core switch A) receives backpressure information for queue PQ1(Hi), the aggregation/core switch 210 may stop scheduling packets to be sent downstream from PQ1(Hi). The aggregation/core switch 210 may receive the backpressure information from the edge switch 220 in a PPFC frame via the corresponding ingress port 222. However, the aggregation/core switch 210 may continue scheduling packets to be sent from other high priority queues (e.g., PQk(Hi), k=2, 3, . . . , n), which may not be paused or affected by the backpressure for PQ1(Hi). Thus, the PPFC system 200 may avoid the HOL blocking that may occur in the PFC system 100.

In different embodiments, different switch architectures for input queuing, output queuing, input and output queuing, shared buffer output queuing, or combinations thereof may be used in the edge switch 220. No specific switch architecture and buffer management scheme are assumed for the edge switch 220. For each packet received, the packet classification unit 224 may determine the packet priority and identify the queue (in the edge switch 220) for the received packet. The queue and buffer management unit 225 may determine if the received packet may be queued or discarded and if a backpressure may be initiated for the ingress port 222 that received the packet. Although no specific buffer management scheme is assumed in the edge switch 220, if a shared buffer architecture is used, which may be common in edge switches, there may be some dedicated memory in the data buffer 226 per ingress port 222 per priority to prevent memory deficiency by other ingress ports 222. There also may be some dedicated memory for data buffer 226 per egress port 228 per priority. The rest of data buffer's memory may be shared (e.g., to some degree) among different priorities or traffic within a given priority, e.g., as determined by the buffer management scheme used.

The end systems 230 may comprise servers, storage devices, and/or other client type nodes. For instance, using server virtualization, each end system 230 may comprise at least two virtual servers (not shown). As such, to achieve the above PPFC scheme, the aggregation/core switch 210 may need to know the following information: the number of end-system facing ports (egress ports 228) in the edge switch 220, an ID for each port, and the addresses in each end system 230 that may receive traffic with high priority. The addresses may be MAC addresses, IP addresses, FC N-Port-IDs, other types of network addresses, or combinations thereof. The aggregation/core switch 210 may use the obtained addresses as part of traffic classification input data to determine which queue to use for each packet received at the aggregation/core switch 210.

The aggregation/core switch 210 may use one of a plurality of approaches to obtain the above information. For instance, in one embodiment the edge switch 220 may explicitly send the above information to the aggregation/core switches 210. In another embodiment, the aggregation/core switch 210 may derive the above information by other means. In yet another embodiment, the above information may be conveyed by a switch or a server other than the edge switch 220 to the aggregation/core switch 210. Alternatively, the edge switch 210 may explicitly send the end system facing port (egress port 228) information to the aggregation/core switches 210. However, the addresses in the end systems 230 may be conveyed to the aggregation/core switches 210 by a separate switch or a server. The different approaches are described in more detail below.

Figure 3:
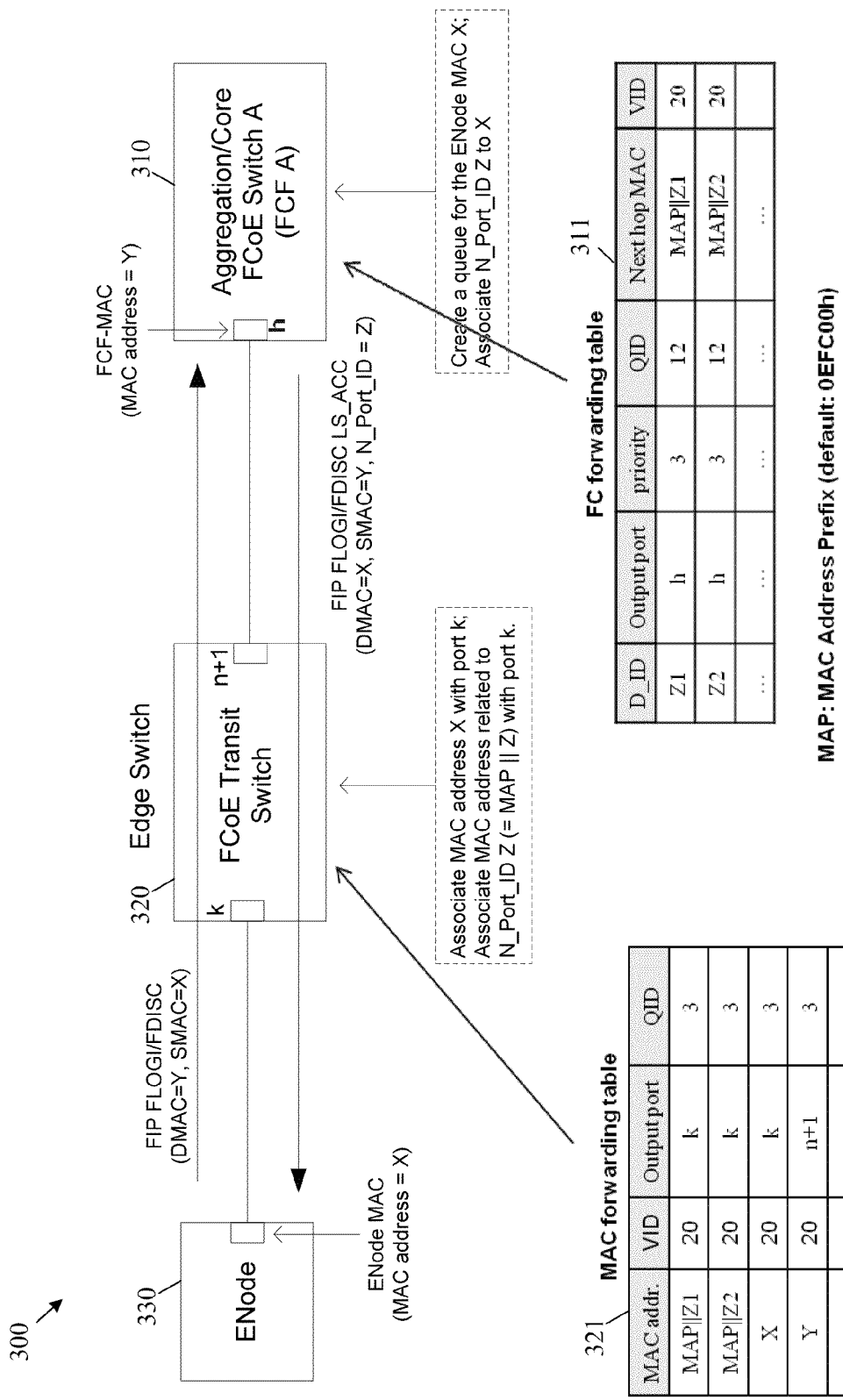
FIG. 3 is a schematic diagram of an embodiment of a queue association scheme.

FIG. 3 illustrates an embodiment of a queue association scheme 300, which may be used in a PPFC system, e.g., the PPFC system 200. The queue association scheme 300 may be used to send the number of end system facing ports (e.g., egress ports 228), the addresses in each end system (e.g., end system 230), and optionally other related information in an edge switch (e.g., the edge switch 220) to one or more associated aggregation/core switches (e.g., the aggregation/core switches 210). The information may be used by the aggregation/core switches to establish the queues for the end system facing ports. Specifically, the aggregation/core switch may behave as an FCoE switch or a FC Forwarder (FCF), and the edge switch may behave as an FCoE transit switch or FIP Snooping Bridge (FSB) between the FCoE switch and the end system. The queue association scheme 300 may comprise an aggregation/core FCoE switch 310, an FCoE transit switch 320, and an end node (ENode) 330, which may correspond to the aggregation/core switch 210, the edge switch 220, and the end system 230, respectively.

The queue association scheme 300 may be used in a FCoE network (e.g., in a data center), where the aggregation/core FCoE switch 310 may be configured as a FCF, e.g., as described in the INCITS T11 publication entitled "Fibre Channel Backbone (FC-BB-5)", Revision 2.0, Jun. 4, 2009, which is incorporated herein by reference. The FCoE traffic may be assigned high priority. When the ENode 330 performs a FIP fabric login (FLOGI) request for a virtual N port (VN-Port) in the ENode 330, the aggregation/core FCoE switch 310 (e.g., FCF A) may create a virtual F port (VF-Port) after receiving the FIP FLOGI request and create a queue (e.g., PQk(Hi)), which may correspond to the ENode's MAC address (MAC X). The aggregation/core FCoE switch 310 also may assign a port ID (N-Port-ID) (e.g., Z) for the VN-Port and send a FIP FLOGI LS-ACC (Link Service Accept) reply to the ENode MAC address.

The FCoE transit switch 320 may be a FSB that snoops the FIP messages exchanged between the ENode 330 and the aggregation/core FCoE switch 310, and thus may learn that the ENode MAC address (MAC X) is attached to the FCoE transit switch's egress port k. The FCoE transit switch 320 also may learn that the VN-Port with the N-Port-ID Z and a MAC address MAPIIZ resides in the ENode MAC X and may be reached via the FCoE transit switch's port k. The FCoE transit switch 320 also may learn that traffic with destination MAC (DMAC) of MAPIIZ arrives from the aggregation/core FCoE switch 310. The VN-Port MAC address may correspond to a cascade of a MAC Address Prefix (MAP) and the N-Port ID Z. A default MAP that corresponds to 0E-FC-00h may be used. For subsequent VN-Port fabric logins via ENode MAC X, the ENode 330 may use FIP FDISC (Discover F_Port Service Parameters) requests. The aggregation/core FCoE switch 310 may associate all N-Port-IDs assigned to VN-Ports in ENode MAC X with the queue PQk(Hi). For example, both N-Port-ID Z1 for VN-Port1 and N-Port-ID Z2 for VN-Port2 may be associated with PQk(Hi)). Similarly, the FCoE transit switch 320 may associate all MAC addresses derived from the N-Port-IDs assigned to VN-Ports in ENode MAC X with the queue Qk(Hi), which may in turn be associated with the FCoE transit switch's egress port k.

When the aggregation/core FCoE switch 310 receives an FCoE frame comprising a destination ID (D-ID) Z, the aggregation/core FCoE switch 310 may queue the frame in queue PQk(Hi), which may be associated with ENode MAC X. When the FCoE transit switch 320 receives an Ethernet frame with DMAC of MAPIIZ and high priority, the FCoE transit switch 320 may queue the frame, which may be an FCoE frame, in the queue Qk(Hi), which may be associated with the egress port k and hence the ENode MAC X. If the FCoE transit switch 320 decides to backpressure the aggregation/core FCoE switch 310 for FCoE traffic destined to ENode MAC X, the FCoE transit switch 320 may send a PPFC frame, e.g., indicating a port ID length of about six octets and a port ID set to the ENode MAC X. The PPFC frame is described in more detail below. Upon receiving the PPFC frame, the aggregation/core FCoE switch 310 may find PQk(Hi) using the ENode MAC X and high priority as index, and hence stop scheduling frames from PQk(Hi).

Both the egress port k and the queue Qk(Hi) of the FCoE transit switch 320 and the queue PQk(Hi) in the aggregation/core FCoE switch 310 may be associated with the ENode MAC X. Thus, there may be no need for the FCoE transit switch 320 to convey the information about the egress port and/or the queue to the aggregation/core FCoE switch 310. The FCoE transit switch 320 and the aggregation/core FCoE switch 310 may comprise a plurality of tables that associate ENode MAC addresses with port IDs, virtual local area network IDs (VIDs), and/or other information. For instance, the FCoE transit switch 320 may comprise a MAC forwarding table 321, which may comprise one or more MAC addresses associated with corresponding VIDs, output ports (at the FCoE transit switch 320), and/or queue ID (QIDs). The aggregation/core FCoE switch 310 also may comprise a FC forwarding table 311, which may comprise one or more D-IDs associated with corresponding output ports (at the aggregation/core FCoE switch 310), priority levels, QIDs, next hop MAC addresses, VIDs, or combinations thereof.

In the queue association scheme 300, the FCoE transit switch 320 may not need to send the information about the end system facing ports to the aggregation/core FCoE switch 310. However, Data Center Bridging Capabilities Exchange (DCBX) protocol extensions may be required to guarantee that both the FCoE transit switch 320 and the aggregation/core FCoE switch 310 support PPFC, if no manual configuration is desired. The DCBX protocol is described in the IEEE P802.1Qaz/D2.5 standard, Mar. 28, 2011, entitled "Enhanced Transmission Selection for Bandwidth Sharing between Traffic Classes", which is incorporated herein by reference.

Figure 4:
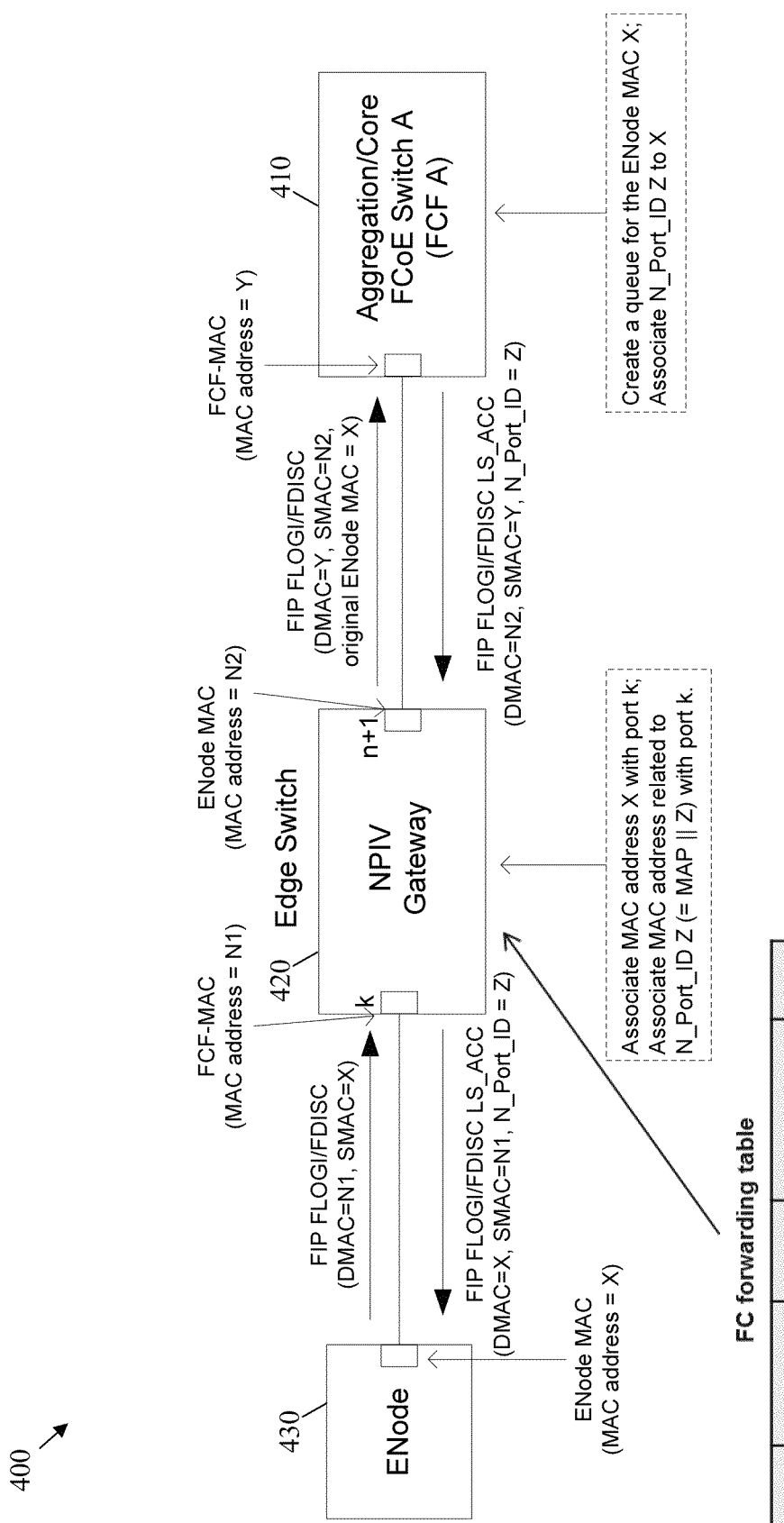
FIG. 4 is a schematic diagram of another embodiment of a queue association scheme.

FIG. 4 illustrates an embodiment of another queue association scheme 400, which may be used in a PPFC system, e.g., the PPFC system 200. The queue association scheme 400 may be used to send the number of end-system facing ports (e.g., egress ports 228), the addresses in each end system (e.g., end system 230), and optionally other related information in an edge switch (e.g., the edge switch 220) to one or more associated aggregation/core switches (e.g., the aggregation/core switches 210). The information may be used by the aggregation/core switches to establish the queues for the end system facing ports. Specifically, the aggregation/core switch may behave as an FCoE switch or FCF and the edge switch may behave as an N-Port Identifier Virtualization (NPIV) gateway between the FCoE switch and the end system. The queue association scheme 400 may comprise an aggregation/core FCoE switch 410, a NPIV gateway 420, and an ENode 430, which may correspond to the aggregation/core switch 210, the edge switch 220, and the ENode 230, respectively.

The queue association scheme 400 may be used in an FCoE network (e.g., in a data center), where the aggregation/core FCoE switch 410 may be configured as a FCF. In the NPIV gateway 420, the ENode facing port k may behave as a FCF-MAC to the ENode 430 and the FCF facing port n+1 may behave as an ENode to the aggregation/core FCoE switch 410 (FCF A). The NPIV gateway 420 may terminate the FIP frames from the ENode 430 and may regenerate the FIP frames to be sent to the aggregation/core FCoE switch 410. The NPIV gateway 420 may implement the same scheme in the opposite direction (from the aggregation/core FCoE switch 410 to the ENode 430).

When the NPIV gateway 420 receives a FIP FLOGI request from the ENode 430 on a port k, the NPIV gateway 420 may create a VF-Port and a queue (e.g., Qk(Hi)), which may correspond to the port k and ENode MAC X for the ENode 430. The NPIV gateway 420 may then send a new FIP FDISC request to the aggregation/core FCoE switch 410 (FCF A). The new FIP FDISC request may comprise information about the original ENode MAC X of the ENode 430. The aggregation/core FCoE switch 410 may process the FIP FDISC request similar to the aggregation/core FCoE switch 310, as described above. However, the aggregation/core FCoE switch 410 may use the original ENode MAC X (at the ENode 430), rather than a real ENode MAC N2 (at the NPIV gateway 420) to associate the address with the queue PQk(Hi) and the N-Port-ID Z. The same process may be repeated for the different ports in ENode 430. For example, both N-Port-ID Z1 for VN-Port1 and N-Port-ID Z2 for VN-Port2 may be associated with PQk(Hi). Upon receiving the FIP FDISC LS-ACC reply from the aggregation/core FCoE switch 410, the NPIV gateway 420 may associate the VN-Port MAC address (=MAP||Z) with the egress port k (as the NPIV gateway 420 receives the FIP FLOGI request from the port k), and thus to the Qk(Hi) and the ENode MAC X.

When the NPIV gateway 420 decides to backpressure the aggregation/core FCoE switch 410 on traffic destined to ENode MAC X (e.g., to queue Qk(Hi)), the NPIV gateway 420 may send a PPFC frame, e.g., indicating a port ID length of about six octets and a port ID set to the original ENode MAC X. Upon receiving the PPFC frame, the aggregation/core FCoE switch 410 may use the ENode MAC X and high priority as an index to find the queue PQk(Hi) and stop scheduling packets from that queue. In the queue association scheme 400, the NPIV gateway 420 may not need to send the information about the ENode's facing ports to the aggregation/core FCoE switch 410. However, DCBX protocol extensions may be required to guarantee that both the NIPIV gateway 420 and the aggregation/core FCoE switch 410 support PPFC, if no manual configuration is desired. Further, the aggregation/core FCoE switch 410 also may comprise a FC forwarding table (not shown), e.g., similar to the FC forwarding table 311, and the NPIV gateway 420 may also comprise a FC forwarding table.

Figure 5:
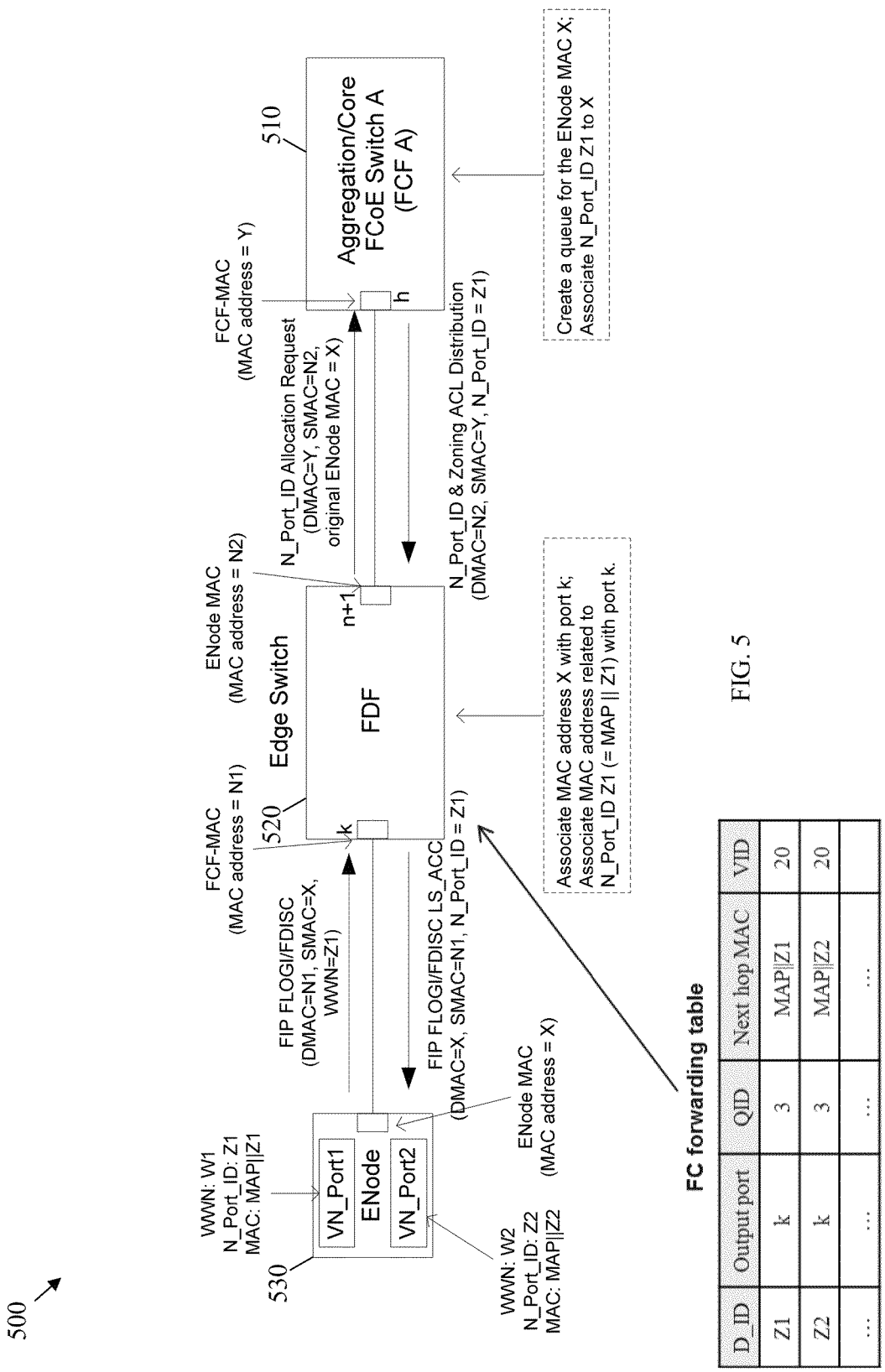
FIG. 5 is a schematic diagram of another embodiment of a queue association scheme.

FIG. 5 illustrates an embodiment of another queue association scheme 500, which may be used in a PPFC system, e.g., the PPFC system 200. The queue association scheme 500 may be used to send the number of end-system facing ports (e.g., egress ports 228), the addresses in each end system (e.g., end system 230), and optionally other related information in an edge switch (e.g., the edge switch 220) to one or more associated aggregation/core switches (e.g., the aggregation/core switches 210). The information may be used by the aggregation/core switches to establish the queues for the end system facing ports. Specifically, the aggregation/core switch may behave as an FCoE switch or FCF and the edge switch may behave as a FCoE Data Forwarder (FDF) between the FCoE switch and the end system. The queue association scheme 500 may comprise an aggregation/core FCoE switch 510, a FDF 520, and an ENode 530, which may correspond to the aggregation/core switch 210, the edge switch 220, and the end system 230, respectively.

The queue association scheme 500 may be similar to the queue association scheme 400. However, the FDF 520 may terminate the FIP frames from the ENode 530 and it may not need to send the information about the ENode's facing ports to the aggregation/core FCoE switch 510. DCBX protocol extensions also may be applied in the queue association scheme 500. Unlike the NPIV gateway 420, the FDF 520 may not regenerate the FIP frames to be sent to the aggregation/core FCoE switch 510. Instead, the FDF 520 may send an N-Port-ID allocation request to the aggregation/core FCoE switch 510, which may comprise similar information as the FIP frames in the queue association scheme 400. The aggregation/core FCoE switch 510 may return an N-Port-ID and zoning access control list (ACL) distribution information, which may be similar to the FIP FLOGI LS-ACC information above. The aggregation/core FCoE switch 510 also may comprise a FC forwarding table (not shown), e.g., similar to the FC forwarding table 311, and the FDF 520 may also comprise a MAC forwarding table.

In the queue association scheme 500, the FDF 520 may not need to send the information about the ENode's facing ports to the aggregation/core FCoE switch 510. However, DCBX protocol extensions may be required to guarantee that both the FDF 520 and the aggregation/core FCoE switch 510 support PPFC, if no manual configuration is desired.

Figure 6:
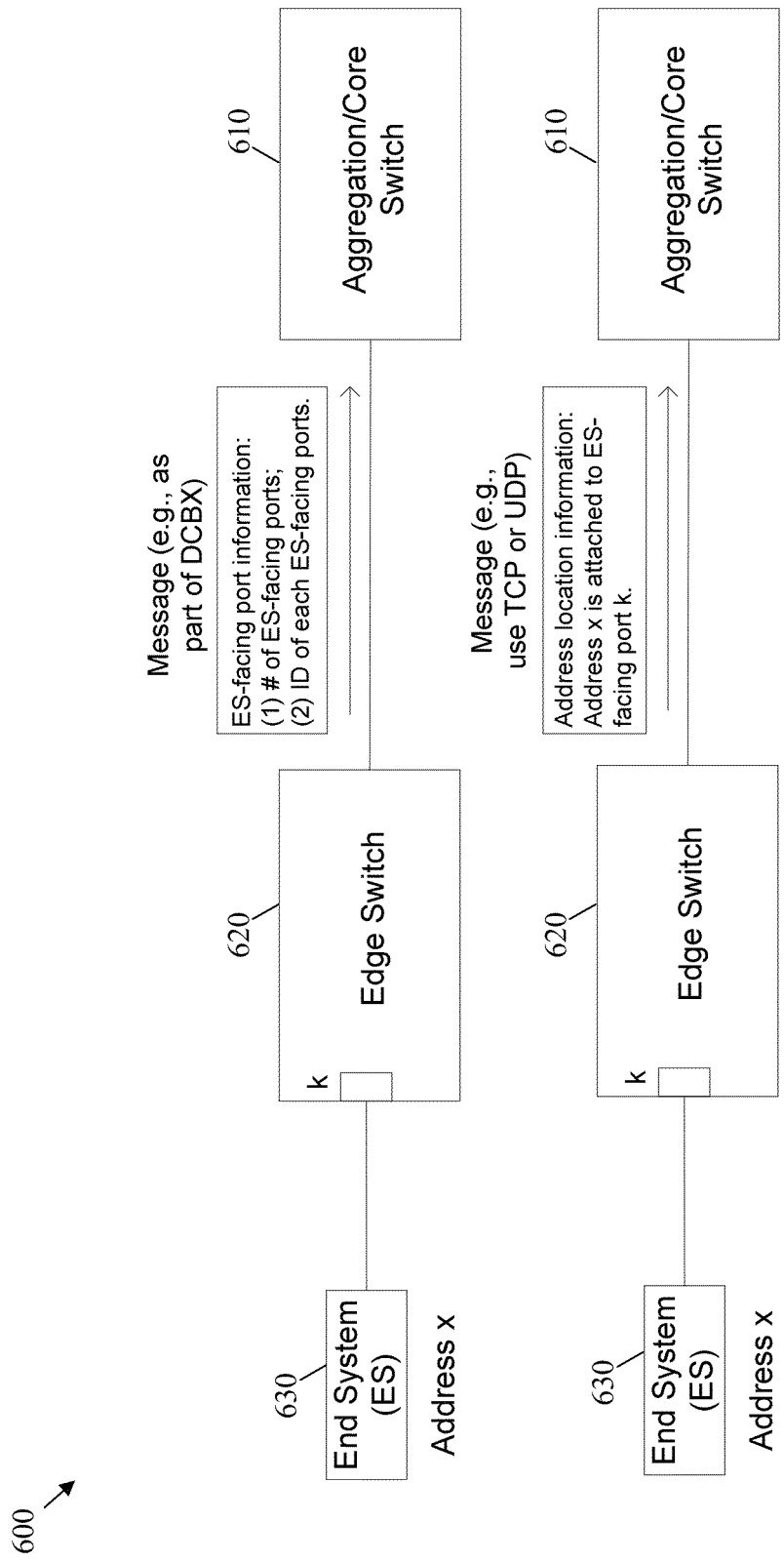
FIG. 6 is a schematic diagram of another embodiment of a queue association scheme.

FIG. 6 illustrates an embodiment of another queue association scheme 600, which may be used in a PPFC system, e.g., the PPFC system 200. The queue association scheme 600 may be used to send the number of end-system facing ports (e.g., egress ports 228), the addresses in each end system (e.g., end system 230), and optionally other related information in an edge switch (e.g., the edge switch 220) to one or more associated aggregation/core switches (e.g., the aggregation/core switches 210). The information may be used to establish queues for the different end system facing ports, as in the schemes above. The queue association scheme 600 may comprise an aggregation/core switch 610, an edge switch 620, and an end system 630, which may correspond to the aggregation/core switch 210, the edge switch 220, and the end system 230, respectively.

The edge switch 620 may send the PPFC queue association information (the end-system facing ports and the addresses in each end system) to the aggregation/core switch 610 in an explicit manner in a message using DCBX protocol extensions and optionally additional information exchange. For instance, a new Type-Length-Value (TLV) that comprises a new corresponding sub-type may be defined in the DCBX protocol to convey the information about the edge switch end system facing ports. The new TLV may comprise a TLV type that may be set to about 127 and at least some of the following information: an IEEE 802.1 sub-type ID, a Port ID type (e.g., a numeric number, a MAC address, etc.), a length of the Port ID, a number of end system facing ports, and a list of Port IDs. The information of addresses associated with (or coupled to) the end system facing ports (port k) also may be conveyed by the edge switch 620 to the aggregation/core switch 610 using IP, e.g., using Transmission Control Protocol (TCP) or User Datagram Protocol (UDP). The aggregation/core switch 610 also may comprise a FC forwarding table (not shown), e.g., similar to the FC forwarding table 311, and the edge switch 620 may comprise a FC forwarding table (not shown), e.g., similar to the FC forwarding table (in FIG. 4) if the application is FCoE.

In the queue association scheme 600, the edge switch 620 may not need to send the information about the ENode's facing ports to the aggregation/core switch 610. However, DCBX protocol extensions may be required to guarantee that both the edge switch 620 and the aggregation/core switch 610 support PPFC, if no manual configuration is desired.

Figure 7:
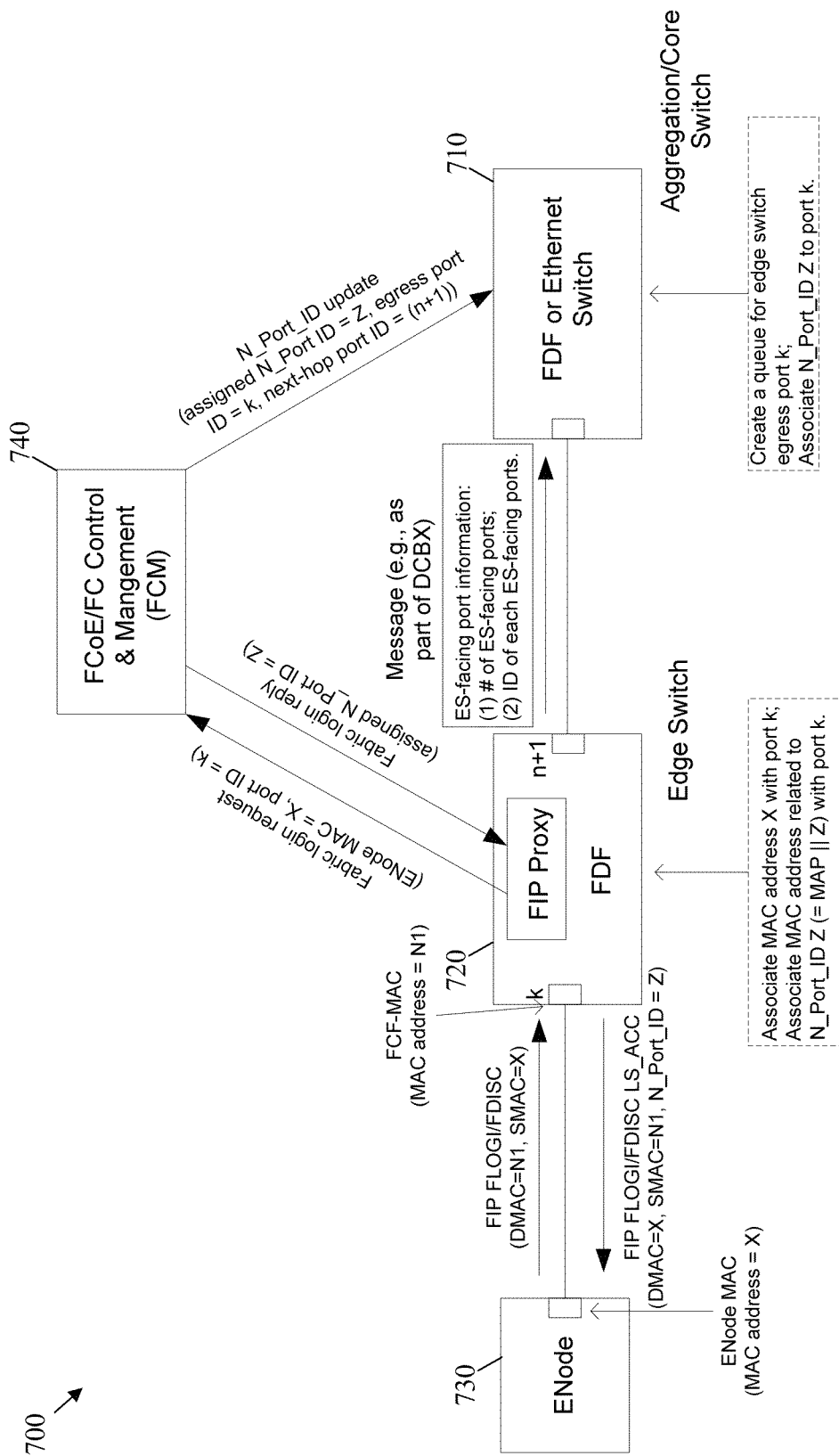
FIG. 7 is a schematic diagram of another embodiment of a queue association scheme.

FIG. 7 illustrates an embodiment of another queue association scheme 700, which may be used in a PPFC system, e.g., the PPFC system 200. The queue association scheme 700 may be used to send the number of end-system facing ports (e.g., egress ports 228), the addresses in each end system (e.g., end system 230), and optionally other related information in an edge switch (e.g., the edge switch 220) to one or more associated aggregation/core switches (e.g., the aggregation/core switches 210). Specifically, the aggregation/core switch may behave as a FDF or may be an Ethernet switch and the edge switch may behave as an edge FDF that comprises a FIP Proxy between the aggregation/core switch and the end system. The queue association scheme 700 may comprise an FDF or Ethernet switch 710, an edge FDF 720 comprising a FIP Proxy 721, an ENode 730, which may correspond to the aggregation/core switch 210, the edge switch 220, and the end system 230, respectively. Additionally, the queue association scheme 700 may comprise an FCoE/FC control and management (FCM) node 740 configured to communicate with the FDF or Ethernet switch 710 and the edge FDF 720.

The FCM node 740 may be configured as described in U.S. Provisional Patent Application 61/480,671. The edge FDF 720 and the FDF or Ethernet switch 710 may be configured for FCoE frame forwarding, e.g., using FDF forwarding tables. The FDF forwarding tables may be computed by the FCM node 740 and downloaded to each of the edge FDF 720 and the FDF or Ethernet switch 710.

Upon receiving the FIP FLOGI/FDISC request from an ENode MAC (of the ENode 730), the FIP Proxy 721 in the edge FDF 720 may forward the fabric login request to the FCM node 740 in a new message. The FCM node 740 also may be configured for the N-Port-ID assignment. After assigning an N-Port-ID to a VN-Port (of the ENode 730), the FCM node 740 may inform the edge FDF's upstream aggregation/core switches (the FDF or Ethernet switch 710) of the assigned N-Port-ID. The FCM node 740 also may inform the FDF or Ethernet switch 710 of the egress port ID coupled to the VN-Port and the next-hop Port ID. The next-hop Port ID may be the MAC address of the port, e.g., the MAC address of port (n+1). When the FDF or Ethernet switch 710 receives the first N-Port-ID on port k, the FDF or Ethernet switch 710 may create a queue PQk(Hi) for that port.

Optionally, the edge FDF 720 may send the information about the associated end system facing ports to the FDF or Ethernet switch 710 (e.g., using a DCBX protocol) during a link discovery phase. As such, when the FDF or Ethernet switch 710 receives an N-Port-ID update, the FDF or Ethernet switch 710 may check or determine whether the edge switch egress port ID exists. The DCBX protocol extensions also may be applied in the queue association scheme 700. The DCBX protocol may be used to send the end system facing port information from the edge FDF 720 to the FDF or Ethernet switch 710.

In the queue association scheme 700, the edge FDF 720 may not need to send the information about the ENode's facing ports to the FDF or Ethernet switch 710. However, DCBX protocol extensions may be required to guarantee that both the edge FDF 720 and the FDF or Ethernet switch 710 support PPFC, if no manual configuration is desired.

Figure 8:
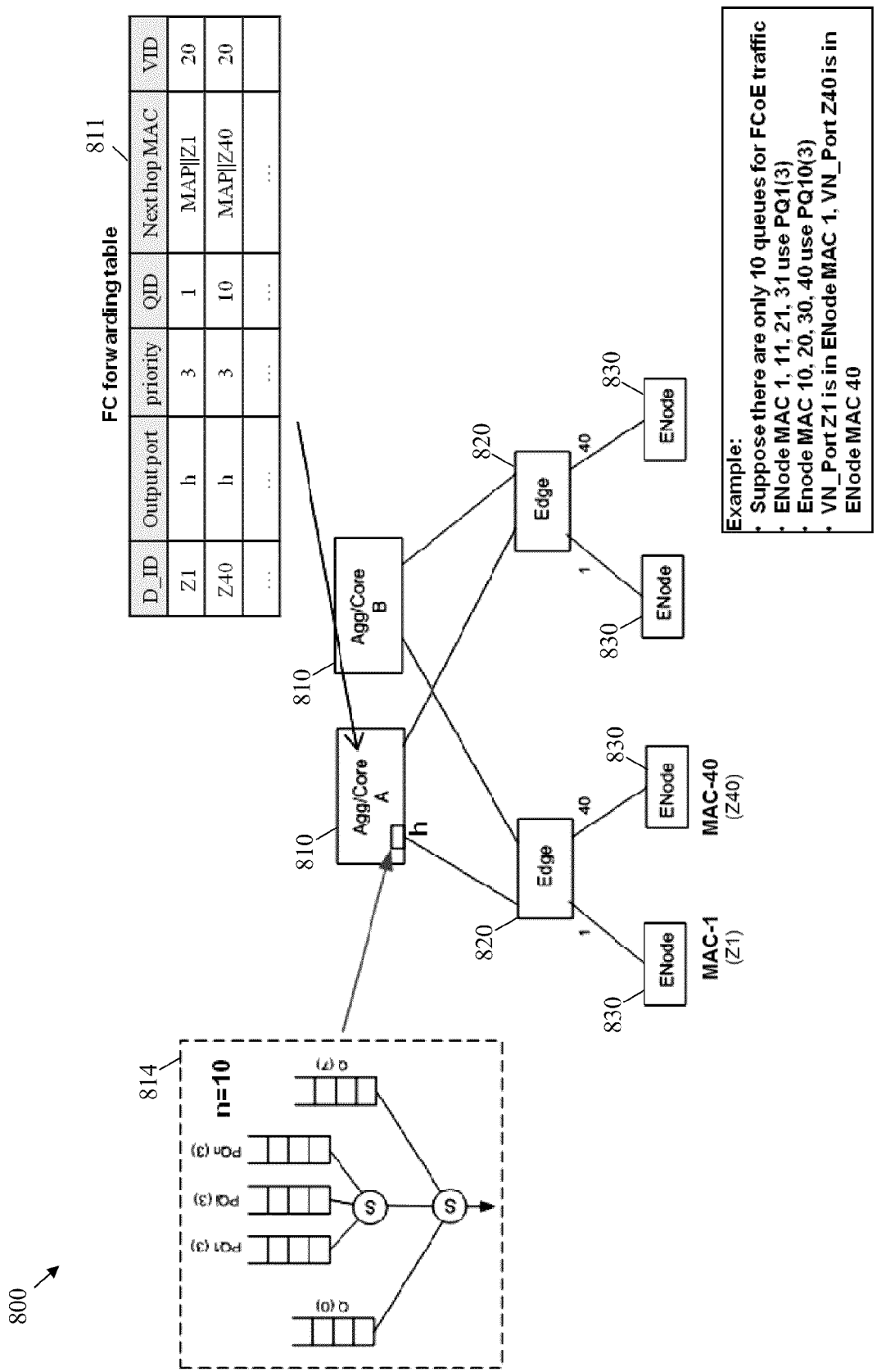
FIG. 8 is a schematic diagram of another embodiment of a PPFC queue scaling architecture.

FIG. 8 illustrates an embodiment of an embodiment of a PPFC queue scaling architecture 800, which may be used in a PPFC system, e.g., the PPFC system 200. The PPFC system may comprise a plurality of aggregation/core switches 810, a plurality of edge switches 820 coupled to the aggregation/core switches 810, and a plurality of ENodes 830 coupled to the edge switches 820. The aggregation/core switches 810, the edge switches 820, and the ENodes 830 may correspond to the aggregation/core switch 210, the edge switch 220, and the ENode 230, respectively.

The queue scaling architecture 800 may comprise a plurality of queues that may be maintained in the aggregation/core switches 810 to account for the number of end system facing ports (in the edge switches 820) and the number of traffic priority levels. Each aggregation/core switch 810 may comprise a data buffer 814 that maintains a hierarchy or tree of queues, which may comprise about two scheduling levels (e.g., using two schedulers S). A first scheduling level may be used to schedule traffic from all available traffic priority levels from the aggregation/core switch 810. The traffic priority levels may include a combination of different high priority levels (e.g., for lossless traffic) and lower priority levels (e.g., for loss tolerated traffic). A second higher scheduling level may be used to schedule the high priority traffic between a plurality of queues (or sub-queues) that correspond to the different end system facing ports in the edge switch 820. At the second scheduling level, the queue (or sub-queue) corresponding to any of the end system facing ports may be blocked to transmit when a backpressure request is received from the edge switch 820, while the remaining peer queues or sub-queues for the other end system facing ports may continue receiving, queuing, and transmitting data. The edge switch 820 may send the backpressure request indicating one of the end system facing ports, e.g., when a corresponding queue at the edge switch 820 is congested or full. The aggregation/core switch 810 also may comprise a FC forwarding table 811, e.g., similar to the FC forwarding table 311.

For example, the traffic may be classified into eight different priority levels. Thus, the first switching level in the data buffer 814 may be used to schedule between eight queues: $Q(0), \ldots, Q(3), \ldots, Q(7)$. At least one of the higher priority level queues, e.g., $Q(3)$ (a logical construct), may be used for lossless traffic. Further, the number of end system facing ports in the edge switch 820 may be equal to n egress ports, which may be coupled to n corresponding ENodes 830 (VN_ports with N_Port_ID Z1 and Z40 are shown which reside in ENodes 830 with MAC addresses MAC 1 and MAC 40 respectively). Thus, the second scheduling level in the data buffer 814 may be used to schedule between n sub-queues PQ1(3), ..., PQi(3), ..., PQn(3). The hierarchy may be used to accommodate any number of end facing ports (and hence any number of high priority queues or sub-queues) and any number of traffic priority levels. If another priority level queue is also used for lossless traffic, such as Q(7), then another set of n sub-queues (not shown) for that priority level may be used (at the second scheduling level) to receive and queue traffic designated for the n end system facing ports. Each set of sub-queues may be scheduled using a corresponding scheduler (at the second scheduling level).

In an embodiment, the aggregation/core switch 810 may comprise (in the data buffer 814) a maximum of about 320 (or 8×40) queues per output port that correspond to about eight priority levels and about 40 queues per priority level. If only two of the eight priority levels (designated as high priority levels) require lossless traffic, then the number of queues may be significantly reduced, e.g., to about 86 (or 6+2×40) queues that correspond to about two high priority levels, about 40 queues per high priority level, and about six additional queues for the rest priority levels. Such number of queues may be supported using a Traffic Manager (TM) chip or a network processor (NPU) and TM chip. An off-chip memory may further be used (at additional cost) to increase buffer per port size (e.g., at about 100 millisecond buffering time). In some scenarios, limiting the number of queues (in the data buffer 814) may be desired. Thus, a round-robin or hashing based method may be used to share physical memory locations as multiple queues (for different ports and/or different priority levels). For instance, hashing based on ENode MAC addresses may be used, e.g., at fabric login.

Figure 9:
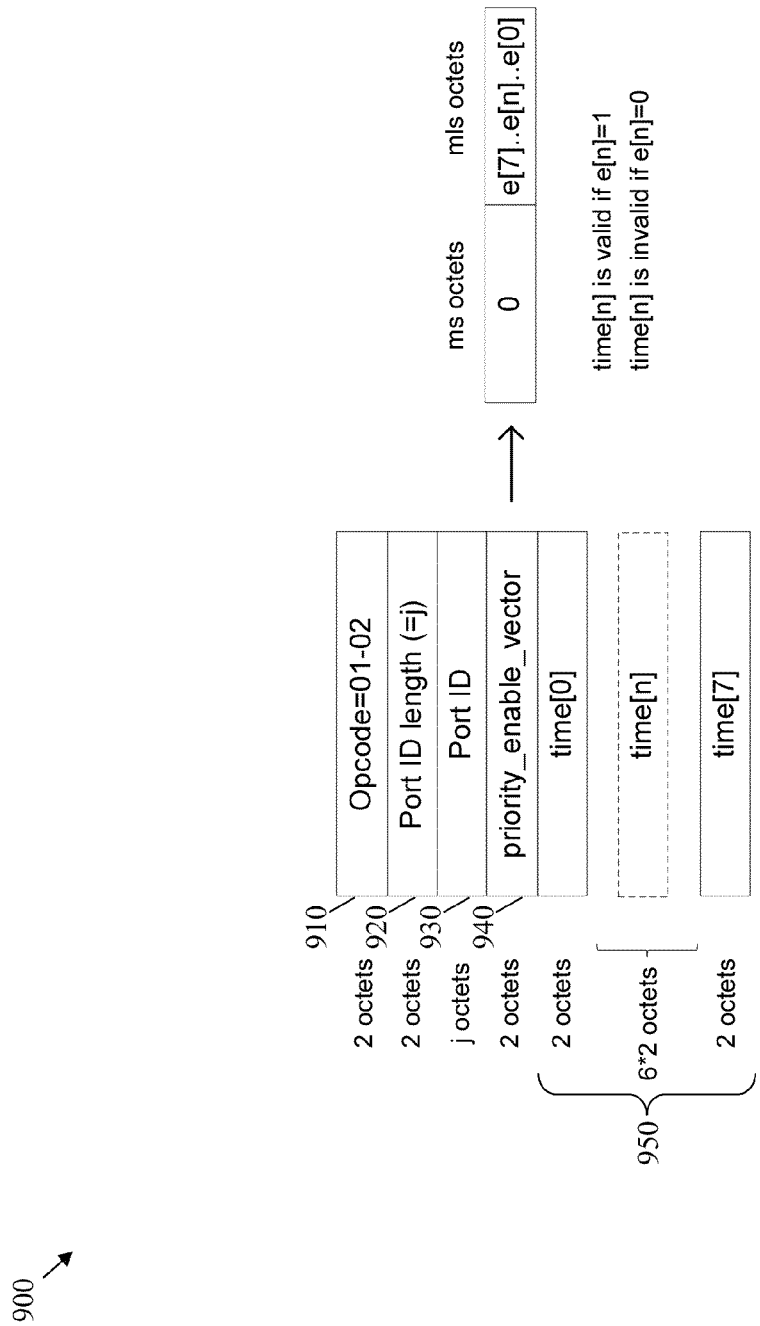
FIG. 9 is a schematic diagram of an embodiment of a PPFC packet data unit (PDU).

FIG. 9 illustrates an embodiment of a PPFC PDU 900, which may be used to send backpressure information from an edge switch to an aggregation/core switch. The backpressure information may specify an egress port ID at the edge switch and the traffic priority level that are subject to a backpressure request. The PPFC PDU 900 may be received by the aggregation/core switch, which may then use the egress port ID and the traffic priority level to identify the corresponding queue and block the traffic in that queue in response to the backpressure request. The PPFC PDU 900 may comprise an operation code (opcode) field 910, a port ID length field 920, a port ID field 930, a priority-enable-vector field 940, and a plurality of time slots 950. The opcode field 910, the priority-enable-vector field 940, and the time slots 950 may be configured similar to the corresponding fields in the PFC frame described in IEEE P802.1Qbb/D2.3 standard.

The opcode field 910 may comprise a value (e.g., 01-02) that indicates the type or format of the PPFC PDU 900 and may have a size of about two octets. The opcode value may be used by the receiver to identify the PDU as a PPFC PDU. The port ID length field 920 may indicate the length of the port ID field 930 and may have a size of about two octets. The port ID field 930 may indicate the end system facing port of the edge switch and may have a variable size. The indicated port ID may correspond to the MAC address of the port or any other ID that uniquely identifies the port.

The priority-enable-vector field 940 may indicate the traffic priority level for the indicated port ID. The priority-enable-vector field 940 may comprise a vector including a plurality of slots or sub-field that correspond to the different priority levels. For example, in the case of eight traffic priority levels, the vector may comprise eight sub-fields or slots (e[0], ..., e[n], ..., e[7], where n≤7) that correspond to the eight priority levels. The slot corresponding to the priority level of the port ID may be set (e.g., to about one) and the remaining slots may not be set (e.g., may be set to about zero). When the aggregation/core switch receives the port ID and the indicated priority level (or levels), the aggregation/core switch may block the corresponding queue (or queues) in the data buffer. The priority-enable-vector field 940 may have a size of about two octets.

The time slots 950 may indicate how long the queue shall be blocked from transmitting data or frames for each of the priority levels. For example, the blocking time may be indicated in milliseconds. In the case of eight traffic priority levels, the number of time slots 950 may be equal to eight (time[0], ..., time[n], ..., time[7], where n≤7), which may correspond to the eight priority levels. The value in the time slot 950 corresponding to the slot that is set in the priority-enable-vector field 940 may be valid, while the remaining time slots 950 may be discarded by the receiver (the aggregation/core switch). For example, only the value of time[7] may be valid if only e[7] is set. Each of the time slots 950 may have a size of about two octets. In some scenarios, multiple queues for different priorities may be blocked at about the same time. For example, both e[3] and e[7] may be set to about one, and hence both time[3] and time[7] may be valid.

Figure 10:
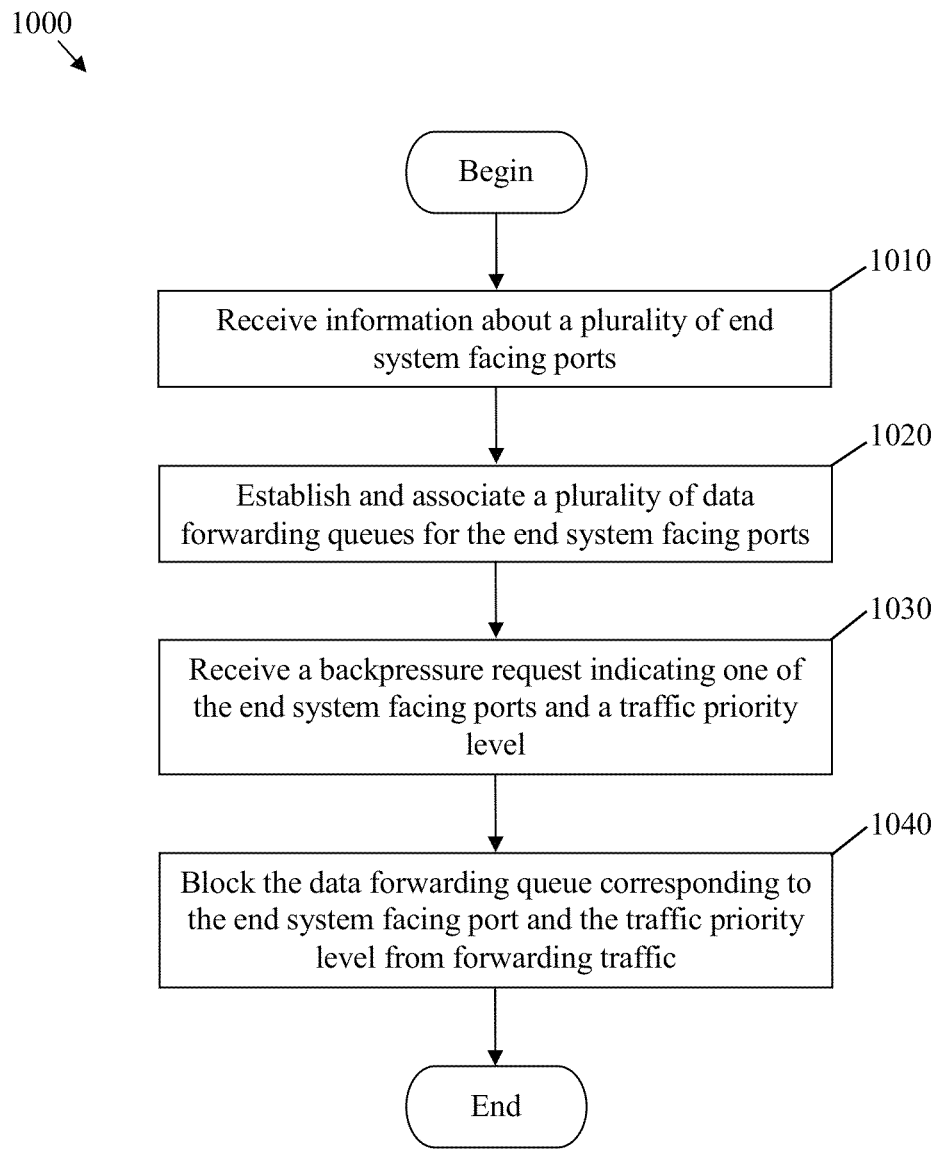
FIG. 10 is a flowchart of an embodiment of a PPFC method.

FIG. 10 illustrates an embodiment of a PPFC method 1000, which may be implemented in a PPFC system, e.g., the PPFC system 200. The PPFC method 1000 may be implemented by an aggregation/core switch in communications with an edge switch, an end system, another network component, or combinations thereof. The PPFC method 100 may comprise associating a plurality of queues in the aggregation/core switch with a plurality of end system facing ports (egress ports) of the edge switch. The queues may be assigned to the same traffic priority level. The PPFC method 1000 also may comprise blocking one of the queues that corresponds to an indicated end system facing port and traffic priority level (to implement backpressure), but not the remaining queues for the other end system facing ports. Thus, the PPFC method 1000 may provide efficient control of congested traffic without causing HOL blocking, which may be useful for lossless FCoE traffic.

The PPFC method 1000 may begin at block 1010, where information about a plurality of end system facing ports may be received. The aggregation/core switch may receive the information from the edge switch, the end system, another component, or combinations thereof, e.g., using any of the queue association schemes described above. The information may comprise the number of the end system facing ports and the associated MAC addresses at the end systems. Additional information also may be received, such as the traffic priority levels associated with each port, and/or other information that may be used for associating data forwarding queues with the end system facing ports.

At block 1020, a plurality of data forwarding queues may be established and associated with the end system facing ports. The queues may be established using dedicated memory in a data buffer of the aggregation/core switch. The queues may be associated with the end system facing ports using a forwarding table, such as the FC forwarding table 811. At block 1030, a backpressure request indicating one of the end system facing ports and a traffic priority level may be received. For instance, the backpressure request may be sent by the edge switch to the aggregation/core switch using a PPFC frame, such as the PPFC frame 900. The indicated end system port at the edge switch may suffer from congestion for the indicated traffic priority level, and hence may require receiving no or less traffic.

At block 1040, the data forwarding queue corresponding to the end system facing port and the traffic priority level may be blocked from forwarding traffic. The aggregation/core switch may block the queue associated (in the forwarding table) with the indicated end system facing port and traffic priority level from forwarding traffic. This may cause the end system facing port at the edge switch to receive no or less traffic from the aggregation/core switch, e.g., until traffic congestion is resolved. However, the remaining end system facing ports at the edge switch may continue to receive traffic (e.g., at the same traffic priority level) from the aggregation/core switch. The PPFC method 1000 may then end.

Figure 11:
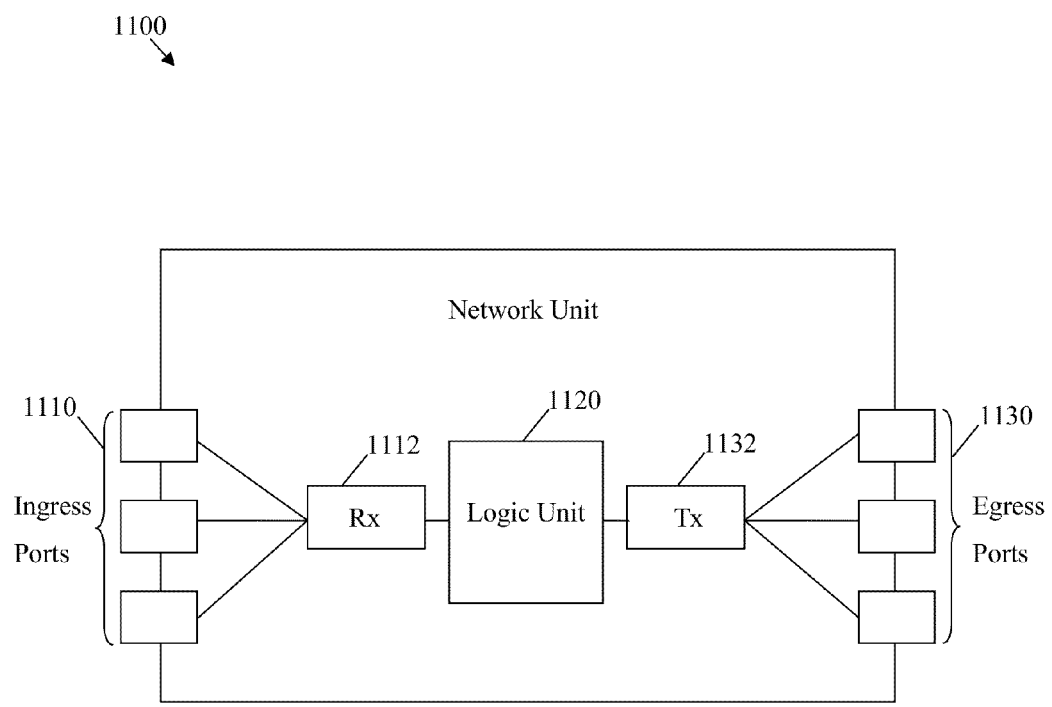
FIG. 11 is a schematic diagram of an embodiment of a network unit.

FIG. 11 illustrates an embodiment of a network unit 1100, which may be any device that transports and processes data through the network. For instance, the network unit 1100 may be located in a data center and may correspond to an aggregation/core switch, an edge switch, and/or an end system (or ENode). The network unit 1100 may comprise one or more ingress ports or units 1110 coupled to a receiver (Rx) 1112 for receiving signals and frames/data from other network components. The network unit 1100 may comprise a logic unit 1120 to determine which network components to send data to. The logic unit 1120 may be implemented using hardware, software, or both. The network unit 1100 also may comprise one or more egress ports or units 1130 coupled to a transmitter (Tx) 1132 for transmitting signals and frames/data to the other network components. The receiver 1112, logic unit 1120, and transmitter 1132 also may implement or support any of the queue association schemes above and/or the PPFC method 1000. The components of the network unit 1100 may be arranged as shown in FIG. 11.

Figure 12:
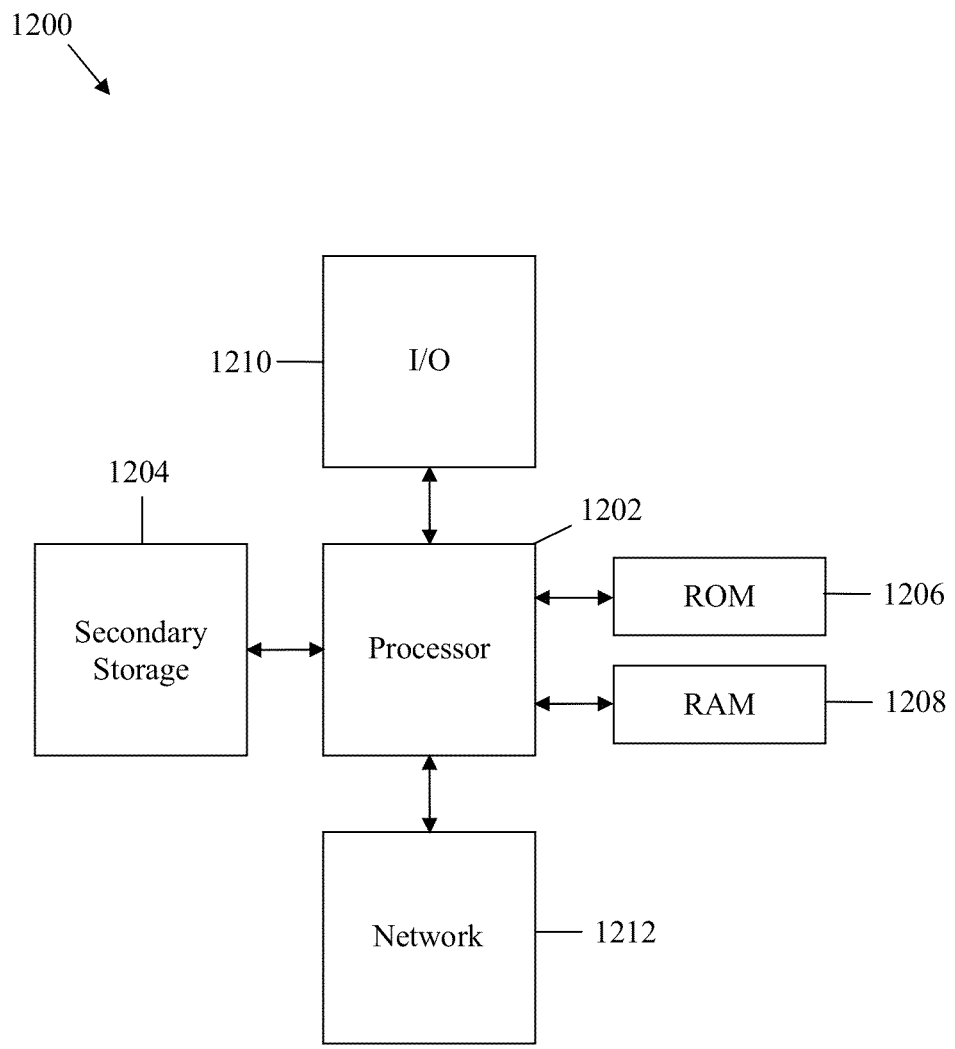
FIG. 12 is a schematic diagram of an embodiment of a general-purpose computer system.

The components and/or methods described above may be implemented on any general-purpose network component, such as a computer or network component with sufficient processing power, memory resources, and network throughput capability to handle the necessary workload placed upon it. FIG. 12 illustrates a typical, general-purpose network component 1200 suitable for implementing one or more embodiments of the components disclosed herein. The network component 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor 1202 may be implemented as one or more CPU chips, or may be part of one or more application specific integrated circuits (ASICs) and/or Digital Signal Processors (DSPs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
 a core switch configured to:
  couple to an edge switch;
  receive information about a plurality of end system facing ports of the edge switch; and receive a backpressure request from the edge switch when one of the end system facing ports of the edge switch is congested, wherein the information about the end system facing ports is used to associate the end system facing ports with a plurality of corresponding queues at the core switch, and wherein the backpressure request specifies at least one of the end system facing ports and an associated traffic priority level used to block one of the corresponding queues in the core switch from sending traffic.

2. The apparatus of claim 1, wherein associating the end system facing ports with the plurality of corresponding queues comprises establishing a plurality of queues for a same traffic priority level that is associated with the end system facing ports of the edge switch.

3. An apparatus comprising:
a core switch configured to:
couple to an edge switch; and
receive information about a plurality of end system facing ports of the edge switch,
wherein the information about the end system facing ports is used to associate the end system facing ports with a plurality of corresponding queues at the core switch,
wherein associating the end system facing ports with the plurality of corresponding queues comprises establishing a plurality of queues for a same traffic priority level that is associated with the end system facing ports of the edge switch, and
wherein the core switch comprises:
a first scheduler coupled to a plurality of first level queues associated with the same traffic priority level that is associated with the end system facing ports and assigned to a high priority traffic level;
a second scheduler coupled to the first scheduler and to an additional queue associated with the end system facing ports and assigned to a low priority traffic level; and
an output port coupled to the second scheduler and the edge switch.

4. The apparatus of claim 2, wherein the core switch is further configured to block one of the corresponding queues that is associated with the at least one of the end system facing ports and the associated traffic priority level, and allow other corresponding queues of the plurality of corresponding queues to service other end system facing ports.

5. The apparatus of claim 2, wherein the plurality of corresponding queues are associated with the end system facing ports using a forwarding table that comprises at least one of: a destination identifier (ID) that corresponds to a Media Access Control (MAC) address, an associated output port ID of the core switch, a traffic priority level, an associated Queue ID (QID), an associated next hop MAC address that corresponds to the destination ID, and an associated virtual local area network ID (VID).

6. The apparatus of claim 1, wherein the edge switch is coupled to a plurality of end systems via the end system facing ports.

7. The apparatus of claim 6, wherein the information about the end system facing ports comprises a plurality of Media Access Control (MAC) addresses of the end systems.

8. A network component comprising:
a receiver configured to:
receive information from an edge switch about a plurality of end system facing ports of the edge switch; and
receive a backpressure request specifying at least one of the end system facing ports and an associated traffic priority level from the edge switch when the edge switch is congested;
a processor configured to:
establish and associate the end system facing ports with a plurality of corresponding queues; and
block one of the corresponding queues according to the at least one end system facing ports and the associated traffic priority level contained in the backpressure request; and
a transmitter configured to return information about the associated end system facing ports,
wherein the received information indicates the number of end system facing ports and a plurality of Media Access Control (MAC) addresses for a plurality of end systems coupled to the edge switch, and wherein the returned information indicates a plurality of assigned port identifiers (IDs) for the end systems.

9. The network component of claim 8, wherein the end systems comprise a plurality of Fiber Channel over Ethernet (FCoE) Nodes (ENodes), the MAC addresses and the port IDs correspond to the ENodes, and wherein the ENodes comprise a plurality of virtual ports, the MAC addresses and the port IDs correspond to the virtual ports.

10. A network component comprising:
a receiver configured to receive information about a plurality of end system facing ports of an edge switch;
a processor configured to establish and associate the end system facing ports with a plurality of corresponding queues; and
a transmitter configured to return information about the associated end system facing ports,
wherein the network component is a Fiber Channel (FC) Forwarder (FCF) and the edge switch is a Fiber Channel over Ethernet (FCoE) Initialization Protocol (FIP) Snooping Bridge (FSB), and
wherein the FCF receives the information about the end system facing ports from an end system and returns the information about the associated end system facing ports to the end system via the FSB using FIP.

11. A network component comprising:
a receiver configured to receive information about a plurality of end system facing ports of an edge switch;
a processor configured to establish and associate the end system facing ports with a plurality of corresponding queues; and
a transmitter configured to return information about the associated end system facing ports,
wherein the network component is a Fiber Channel (FC) Forwarder (FCF) and the edge switch is a N-Port Identifier Virtualization (NPIV) gateway,
wherein the FCF receives the information about the end system facing ports from the NPIV gateway and returns the information about the associated end system facing ports to the NPIV gateway using Fiber Channel over Ethernet (FCoE) Initialization Protocol (FIP), and
wherein the NPIV gateway receives, regenerates, and forwards the information about the end system facing ports from an end system and receives, regenerates, and forwards the information about the associated end system facing ports from the FCF using FIP.

12. A network component comprising:
a receiver configured to receive information about a plurality of end system facing ports of an edge switch;

a processor configured to establish and associate the end system facing ports with a plurality of corresponding queues; and
a transmitter configured to return information about the associated end system facing ports,
wherein the network component is a Fiber Channel (FC) Forwarder (FCF) and the edge switch is a Data-Plane Forwarder (FDF), wherein the FDF receives the information about the end system facing ports from an end system and returns the information about the associated end system facing ports to the end system using Fiber Channel over Ethernet (FCoE) Initialization Protocol (FIP), and
wherein the FDF sends the information about the end system facing ports to the FCF and receives the information about the associated end system facing ports from the FCF without using FIP.

13. A network component comprising:
a receiver configured to:
  receive information from an edge switch about a plurality of end system facing ports of the edge switch; and
  receive a backpressure request specifying at least one of the end system facing ports and an associated traffic priority level from the edge switch when the edge switch is congested;
a processor configured to:
  establish and associate the end system facing ports with a plurality of corresponding queues; and
  block one of the corresponding queues according to the at least one end system facing ports and the associated traffic priority level contained in the backpressure request; and
a transmitter configured to return information about the associated end system facing ports,
wherein the information about the end system facing ports is received from the edge switch and the information about the associated end system facing ports is returned to the edge switch using Data Center Bridging Capabilities Exchange (DCBX) protocol, Internet Protocol (IP), or both.

14. A network component comprising:
a receiver configured to receive information about a plurality of end system facing ports of an edge switch;
a processor configured to establish and associate the end system facing ports with a plurality of corresponding queues; and
a transmitter configured to return information about the associated end system facing ports,
wherein the network component is a Fiber Channel over Ethernet (FCoE) Data Forwarder (FDF) and the edge switch is an edge FDF that comprises a FCoE Initialization Protocol (FIP) Proxy,
wherein the FDF receives the information about the end system facing ports from the edge FDF and returns the information about the associated end system facing ports to the edge FDF via a FCoE control and management (FCM) node coupled to the FDF and the edge FDF using Data Center Bridging Capabilities Exchange (DCBX) protocol, and
wherein the edge FDF receives the information about the end system facing ports from an end system and returns the information about the associated end system facing ports to the end system using FIP.

15. A method implemented by a network component comprising:
receiving from an edge switch information about a plurality of end system facing ports of the edge switch;
associating a plurality of data forwarding queues at a core switch coupled to the edge switch with the plurality of end system facing ports of the edge switch;
receiving from the edge switch information comprising a backpressure request that indicates the edge switch is congested,
wherein the backpressure request identifies one of the end system facing ports and an associated traffic priority level used to block one of the data forwarding queues, and
wherein associating the end system facing ports with the plurality of data forwarding queues comprises establishing a plurality of queues for a same traffic priority level that are associated with the plurality of end system facing ports of the edge switch,
blocking one of the data forwarding queues that is associated with the one of the end system facing ports and the associated traffic priority level; and
allowing other data forwarding queues of the plurality of data forwarding queues to service the other end system facing ports.

16. The method of claim 15, wherein allowing other data forwarding queues of the plurality of data forwarding queues to service the other end system facing ports corresponds to not blocking remaining data forwarding queues that are associated with remaining end system facing ports of the edge switch and have the same associated traffic priority level.

17. The method of claim 15, wherein the backpressure request is sent in a priority and port based flow control (PPFC) system packet data unit (PDU) that comprises an operation code (opcode) field, a port identifier (ID) length field, a port ID field, a priority-enable-vector field, and a plurality of time fields.

18. The method of claim 17, wherein the opcode field indicates the format and/or type of the PPFC PDU, the port ID length field indicates the length of a port ID indicated in the port ID field, the port ID in the port ID field indicates the end system facing port, the priority-enable-vector field indicates the traffic priority level, and the time fields indicate a queuing time of one of the data forwarding queues associated with the indicated end system facing port.

19. The method of claim 18, wherein the priority-enable-vector field comprises a plurality of sub-fields corresponding to a plurality of supported traffic priority levels, and the time fields correspond to the same supported traffic priority levels, and wherein only one of the sub-fields is set to indicate the traffic priority level, and only one of the time slots that corresponds to the same traffic priority level is valid.

20. An apparatus comprising:
an edge switch comprising a plurality of end system facing ports and configured to:
  couple to a plurality of end systems via the end system facing ports and to a core switch; and
  send information about the end system facing ports and a backpressure request to the core switch when the edge switch is congested,
wherein the backpressure request comprises an indication of at least one of the end system facing ports and an associated traffic priority level,
wherein the information about the end system facing ports is used to associate the end system facing ports with a plurality of corresponding queues at the core switch, and
wherein the information about the end system facing ports and the associated traffic priority level are used to block one of the corresponding queues, wherein the edge switch further comprises:
  an ingress port coupled to the core switch;
  one or more second ingress ports coupled to one or more second core switches;
  an internal switching logic unit coupled to the ingress port and the second ingress ports;
  a packet classification unit coupled to the internal switching logic unit;
  a queue and buffer management unit coupled to the internal switching logic unit; and
  a data buffer coupled to the internal switching logic unit and to the end system facing ports.

21. An apparatus comprising:
an edge switch comprising a plurality of end system facing ports and configured to:
  couple to a plurality of end systems via the end system facing ports and to a core switch; and
  send information about the end system facing ports and a backpressure request to the core switch when the edge switch is congested,
wherein the backpressure request comprises an indication of at least one of the end system facing ports and an associated traffic priority level,
wherein the information about the end system facing ports is used to associate the end system facing ports with a plurality of corresponding queues at the core switch, and
wherein the information about the end system facing ports and the associated traffic priority level are used to block one of the corresponding queues,
wherein the end systems comprise a plurality of virtual ports assigned a plurality of Media Access Control (MAC) addresses, and wherein the edge switch comprises a MAC forwarding table comprising at least one of a MAC address, a virtual local area network identifier (ID) (VID) associated with the MAC address, an output port ID of the edge switch associated with the MAC address, and a queue ID (QID) associated with the MAC address.

22. A network component comprising:
a receiver configured to:
  receive information from an edge switch about a plurality of end system facing ports of the edge switch; and
  receive a backpressure request specifying at least one of the end system facing ports and an associated traffic priority level from the edge switch when the edge switch is congested;
a processor configured to:
  establish and associate the end system facing ports with a plurality of corresponding queues; and
  block one of the corresponding queues according to the at least one end system facing ports and the associated traffic priority level contained in the backpressure request; and
a transmitter configured to return information about the associated end system facing ports,
wherein the processor is further configured to block a first data transmission from one of the plurality of corresponding queues based on the backpressure request, wherein a second data transmission from a remainder of the plurality of corresponding queues not identified by the backpressure request is transmitted.

* * * * *